(12) United States Patent
Bao et al.

(10) Patent No.: US 10,467,500 B1
(45) Date of Patent: Nov. 5, 2019

(54) METHOD AND SYSTEM FOR SEMANTIC SEGMENTATION INVOLVING MULTI-TASK CONVOLUTIONAL NEURAL NETWORK

(71) Applicant: DiDi Research America, LLC, Mountain View, CA (US)

(72) Inventors: Ruxiao Bao, Mountain View, CA (US); Xun Xu, Mountain View, CA (US)

(73) Assignee: DiDi Research America, LLC, Mountain View, CA (US)

( * ) Notice: Subject to any disclaimer, the term of this patent is extended or adjusted under 35 U.S.C. 154(b) by 0 days.

(21) Appl. No.: 16/237,069

(22) Filed: Dec. 31, 2018

(51) Int. Cl.
*G06K 9/00* (2006.01)
*G06K 9/62* (2006.01)
(Continued)

(52) U.S. Cl.
CPC ......... *G06K 9/6232* (2013.01); *G06K 9/6257* (2013.01); *G06K 9/726* (2013.01);
(Continued)

(58) Field of Classification Search
CPC .... G06K 9/6232; G06K 9/6257; G06K 9/726; G06K 2209/21; G06K 2209/27;
(Continued)

(56) References Cited

U.S. PATENT DOCUMENTS 10,043,113 B1 8/2018 Kim et al.
10,049,323 B1 8/2018 Kim et al.
(Continued)

FOREIGN PATENT DOCUMENTS

WO 2017198909 A1 11/2017

OTHER PUBLICATIONS

Mao, et al., "Vehicle Instance Segmentation From Aerial Image and Video Using a Multitask Learning Residual Fully Convolutional Network", (2018), IEEE Transactions on Geoscience and Remote Sensing, vol. 56, No. 11, pp. 6699-6711. (Year: 2018).*

(Continued)

*Primary Examiner* — Van D Huynh
(74) *Attorney, Agent, or Firm* — Kikpatrick Townsend & Stockton LLP

(57) ABSTRACT

Methods and systems involving convolutional neural networks as applicable for semantic segmentation, including multi-task convolutional networks employing curriculum based transfer learning, are disclosed herein. In one example embodiment, a method of semantic segmentation involving a convolutional neural network includes training and applying the convolutional neural network. The training of the convolutional neural network includes each of training a semantic segmentation decoder network of the convolutional neural network, generating first feature maps by way of an encoder network of the convolutional neural network, based at least in part upon a dataset received at the encoder network, and training an instance segmentation decoder network of the convolutional neural network based at least in part upon the first feature maps. The applying includes receiving an image, and generating each of a semantic segmentation map and an instance segmentation map in response to the receiving of the image, in a single feedforward pass.

20 Claims, 6 Drawing Sheets

(51) Int. Cl.
| | |
|---|---|
| *G06K 9/72* | (2006.01) |
| *G06T 9/00* | (2006.01) |
| *G06T 7/10* | (2017.01) |
| *G06N 3/08* | (2006.01) |
| *G06T 7/168* | (2017.01) |

(52) U.S. Cl.
CPC ............... *G06N 3/08* (2013.01); *G06T 7/10* (2017.01); *G06T 9/002* (2013.01); *G06K 2209/21* (2013.01); *G06K 2209/27* (2013.01); *G06T 7/168* (2017.01); *G06T 2207/20081* (2013.01); *G06T 2207/20084* (2013.01)

(58) Field of Classification Search
CPC .. G06N 3/08; G06T 9/002; G06T 7/10; G06T 7/168; G06T 2207/20084; G06T 2207/20081
USPC .......................................................... 382/103
See application file for complete search history.

(56) References Cited

U.S. PATENT DOCUMENTS

| | | | | |
|---|---|---|---|---|
| 10,095,977 | B1 | 10/2018 | Kim et al. | |
| 10,163,022 | B1 | 12/2018 | Cho | |
| 10,169,679 | B1 | 1/2019 | Kim et al. | |
| 2018/0253622 | A1* | 9/2018 | Chen | G06N 3/0454 |
| 2018/0330238 | A1* | 11/2018 | Luciw | G06N 3/08 |
| 2019/0050667 | A1* | 2/2019 | Wang | G05D 1/0246 |
| 2019/0057507 | A1* | 2/2019 | El-Khamy | G06T 7/11 |
| 2019/0147320 | A1* | 5/2019 | Mattyus | G06N 3/0454 382/155 |
| 2019/0147582 | A1* | 5/2019 | Lee | G06T 5/005 382/156 |

OTHER PUBLICATIONS

Jiang, et al., "Medical image semantic segmentation based on deep learning", (2017), Neural Computing in Next Generation Virtual Reality Technology, 29:1257-1265 (Year: 2017).*
Bischke, et al., "Multi-Task Learning for Segmentation of Building Footprints with Deep Neural Networks", Available online at https://arxiv.org/pdf/1709.05932.pdf, Sep. 18, 2017, 7 pages.
Jiang, et al., "RedNet: Residual Encoder-Decoder Network for indoor RGB-D Semantic Segmentation", The School of Automation Science and Engineering, South China University of Technology, Available online at https://arxiv.org/pdf/1806.01054.pdf, Aug. 6, 2018, 14 pages.
PCT/US2018/068172, "International Search Report and Written Opinion", dated Mar. 21, 2019, 7 pages.
Qu, et al., "StripNet: Towards Topology Consistent Strip Structure Segmentation", Proceedings of the 26th ACM International conference on Multimedia, Available online at :https://dl.acm.org/citation.cfm?id=3240553, Oct. 26, 2018, pp. 283-291.
Teichmann, et al., "MultiNet: Real-time Joint Semantic Reasoning for Autonomous Driving", Available online at https://arxiv.org/pdf/1612.07695.pdf, May 8, 2018, 10 pages.
Zheng, et al., "ModaNet: A Large-Scale Street Fashion Dataset with Polygon Annotations", Available online at https://arxiv.org/pdf/1807.01394.pdf, Oct. 23, 2018, 9 pages.
"Image Segmentation", Wikipedia <https://en.wilipedia.org/wiki/Image_segmentation> Date accessed Dec. 11, 2018, pp. 1-16.
Le, James, "How to do Semantic Segmentation using Deep Learning" <https://medium.com/nanonets/how-to-do-image-segmentation-using-deep-learning-c673cc5862ef> Date accessed Dec. 11, 2018, pp. 1-12.
Chilamkurthy, Sasank, "A 2017 Guide to Semantic Segmentation with Deep Learning", <http://blog.qure.ai/notes/semantic-segmentation-deep-learning-review> Date accessed Dec. 11, 2018, pp. 1-19.
Long et al., "Fully Convolutional Networks for Semantic Segmentation" pp. 1-10, (2015).

"Models and examples built with TensorFlow." GitHub <https://github.com/tensorflow/models> Date accessed Feb. 28, 2019, pp. 1-2.
"Mask R-CNN for object detection and instance segmentation on Keras and TensorFlow". GitHub <https://github.com/matterport/Mask_RCNN> Date accessed Feb. 28, 2019, pp. 1-15.
Zamir et al. "Taskonomy: Disentangling Task Transfer Learning" pp. 3712-3722. (2018).
Bengio et al. "Curriculum learning" In Proceedings of the 26th Annual International Conference on Machine Learning, ICML '09, pp. 41-48, New York, NY, USA, 2009. ACM, pp. 1-8.
Chen et al. Deeplab: Semantic image segmentation with deep convolutional nets, atrous convolution, and fully connected CRFs CoRR, abs/1606.00915, 2016, pp. 1-14.
Chen et al. "Rethinking atrous convolution for semantic image segmentation" CoRR, abs/1706.05587, 2017, pp. 1-14.
Chen et al. "Encoder-decoder with atrous separable convolution for semantic image segmentation" CoRR, abs/1802.02611, 2018, pp. 1-18.
Chollet, Francois. "Xception: Deep learning with depthwise separable convolutions" CoRR, abs/1610.02357, 2016, pp. 1-8.
Cordts et al. "The cityscapes dataset for semantic urban scene understanding" CoRR, abs/1604.01685, 2016, pp. 1-29.
Dai et al. "Deformable convolutional networks" CoRR, abs/1703.06211, 2017, pp. 1-12.
He et al. "Mask R-CNN" CoRR, abs/1703.06870, 2017, pp. 1-12.
Lin et al. "Feature pyramid networks for object detection" CoRR, abs/1612.03144, 2016, pp. 1-10.
Liu et al. "Path aggregation network for instance segmentation" CoRR, abs/1803.01534, 2018, pp. 1-11.
Ren et al. "Faster R-CNN: towards real-time object detection with region proposal networks" CoRR, abs/1506.01497, 2015, pp. 1-14.
Li et al. "Learning to Fuse Things and Stuff" pp. 1-14, (2018).
Chen et al. "KNN Matting" Pattern Analysis and Machine Intelligence, IEEE Transactions on, 35(9):2175-2188, Sep. 2013.
He et al. "A global sampling method for alpha matting" In Proceedings of the 2011 IEEE Conference on Computer Vision and Pattern Recognition, CVPR '11, pp. 2049-2056, Washington, DC, USA, 2011. IEEE Computer Society.
Levin et al. "A closed form solution to natural image matting" In Proceedings of the 2006 IEEE Computer Society Conference on Computer Vision and Pattern Recognition—vol. 1, CVPR '06, pp. 61-68, Washington, DC, USA, 2006. IEEE Computer Society.
Levin et al. "Spectral matting" IEEE Trans. Pattern Anal. Mach. Intell., 30(10):1699-1712, Oct. 2008.
Ronneberger et al. "U-Net: Convolutional networks for biomedical image segmentation" CoRR, abs/1505.04597, 2015.
Dai et al. "Deformable Convolutional Networks—MSRA COCO Detection & Segmentation Challenge 2017 Entry" pp. 1-19.
Sun et al. "Poisson matting" ACM Trans. Graph., 23(3):315-321, Aug. 2004.
Yu et al. "Multi-scale context aggregation by dilated convolutions" CoRR, abs/1511.07122, 2015.
Zhao et al. "Pyramid scene parsing network" CoRR, abs/1612.01105, 2016, pp. 1-11.
Zhuang et al. "Dense relation network: Learning consistent and context-aware representation for semantic image segmentation" pp. 1-6, 2018.
Swiggett, Dylan "Image Matting and Applications" pp. 1-17, (2014).
Hsieh et al. "Automatic Trimap Generation for Digital Image Matting" pp. 1-5, (2014).
Shah, Valay "Natural Image Matting" CS129 Computational Photography Final Project <http://cs.brown.edu/courses/cs129/results/final/valayshah> Date accessed Dec. 10, 2018, pp. 1-7.
Russakovsky et al. "ImageNet Large Scale Visual Recognition Challenge" IJCV 2015, pp. 1-43.
Lin et al. "Microsoft COCO: Common objects in context" In: ECCV. (2014) pp. 1-15.
Kendall et al. "Multi-Task Learning Using Uncertainty to Weigh Losses for Scene Geometry and Semantics" pp. 1-14, (2018).

* cited by examiner

METHOD AND SYSTEM FOR SEMANTIC SEGMENTATION INVOLVING MULTI-TASK CONVOLUTIONAL NEURAL NETWORK

CROSS-REFERENCE TO RELATED APPLICATIONS

--

STATEMENT REGARDING FEDERALLY SPONSORED RESEARCH OR DEVELOPMENT

--

FIELD

The present disclosure relates to image processing and, more particularly, to methods of image processing using artificial intelligence.

BACKGROUND

Semantic segmentation assigns semantic labels to at least some pixels, and typically to all pixels, of an image. Meanwhile, instance segmentation seeks to assign instance-wise labels to the image, which involves a combination of semantic segmentation and object detection.

Conventional convolutional neural networks perform either semantic segmentation or instance segmentation, but not both. Some research regarding convolutional neural networks has proposed multi-task segmentation networks that perform both semantic and instance segmentation. However, training a multi-task convolutional neural network is difficult to optimize.

Therefore, it would be advantageous if one or more new or improved multi-task convolutional neural networks along with new or improved training method could be developed that largely or entirely overcame one or more of the aforementioned limitations associated with conventional multi-task convolutional neural networks, and/or avoided or overcame one or more other disadvantages, and/or provided one or more other advantages.

SUMMARY

In at least one example embodiment, the present disclosure relates to a method, where the method includes an encoder network and a semantic segmentation decoder network of a convolutional neural network training on a dataset to perform a semantic segmentation task, where the encoder network generates first feature maps during the semantic segmentation task. Additionally, the method also includes an instance segmentation decoder network of the convolutional neural network receiving the first feature maps from the encoder network generated during the semantic segmentation task. Further, the method also includes the instance segmentation decoder network training on the dataset using the first feature maps generated during the semantic segmentation task to perform an instance segmentation task.

In at least one additional example embodiment, the present disclosure relates to a system that includes at least one memory device and at least one processing device coupled at least indirectly with the at least one memory device. The at least one processing device is (or are) configured to operate in accordance with a convolutional neural network architecture including an encoder network, a semantic segmentation decoder network, and an instance segmentation decoder network. Also, the encoder network and the semantic segmentation decoder network are configured to train on a dataset to perform a semantic segmentation task. Further, the encoder network is further configured to generate first feature maps during the semantic segmentation task. Additionally, the instance segmentation decoder network is configured to receive the first feature maps generated by the encoder network. Further, the instance segmentation decoder network is configured to train using the first feature maps and the dataset to perform an instance segmentation task.

Additionally, in at least one further example embodiment, the present disclosure relates to a method of image processing involving a convolutional neural network. The method includes training the convolutional neural network and applying the convolutional neural network. The training of the convolutional neural network includes each of training a semantic segmentation decoder network of the convolutional neural network, and generating first feature maps by way of an encoder network of the convolutional neural network after training the semantic segmentation decoder network, based at least in part upon a dataset received at the encoder network. The training of the convolutional neural network also includes training an instance segmentation decoder network of the convolutional neural network based at least in part upon the first feature maps. Additionally, the applying of the convolutional neural network includes each of receiving an image, and generating each of a semantic segmentation map and an instance segmentation map in response to the receiving of the image, in a single feedforward pass.

DETAILED DESCRIPTION

The present disclosure relates to improved methods and systems for creating and/or applying multi-task convolutional neural networks. In at least some embodiments encompassed herein, the improved methods and systems are capable of performing both semantic segmentation and instance segmentation in a single feedforward pass. Furthermore, in at least some embodiments encompassed herein, the improved methods and systems described herein introduce curriculum based transfer learning methods to the multi-task convolutional neural networks and, consequently, the multi-task convolutional neural networks are operable to transfer feature representations learned during simpler tasks, such as semantic segmentation, to more difficult tasks, such as instance segmentation.

In at least some such embodiments, the improved methods and systems (which also can entail an improved network architecture and/or learning system) can leverage the similarities of underlying representations and ordinal nature of difficulties between two segmentation tasks, thereby reducing computational redundancy. Further, such improved methods and systems can modularize a convolutional neural network into encoder and task-specific decoders to learn decoupled objectives without interleaving among tasks, and also can offer an improved, easy updating pipeline for single task in a multi-task convolutional neural network. By virtue of these features, and the reduced computational redundancy associated with such improved methods and systems, these methods and systems (and any associated network architecture and/or learning system) improve the functioning of multi-task convolutional neural networks, thereby improving the functioning of electrical systems, computers, or networks of computers executing the convolutional neural networks or operating in relation to the convolutional neural networks.

Figure 1:
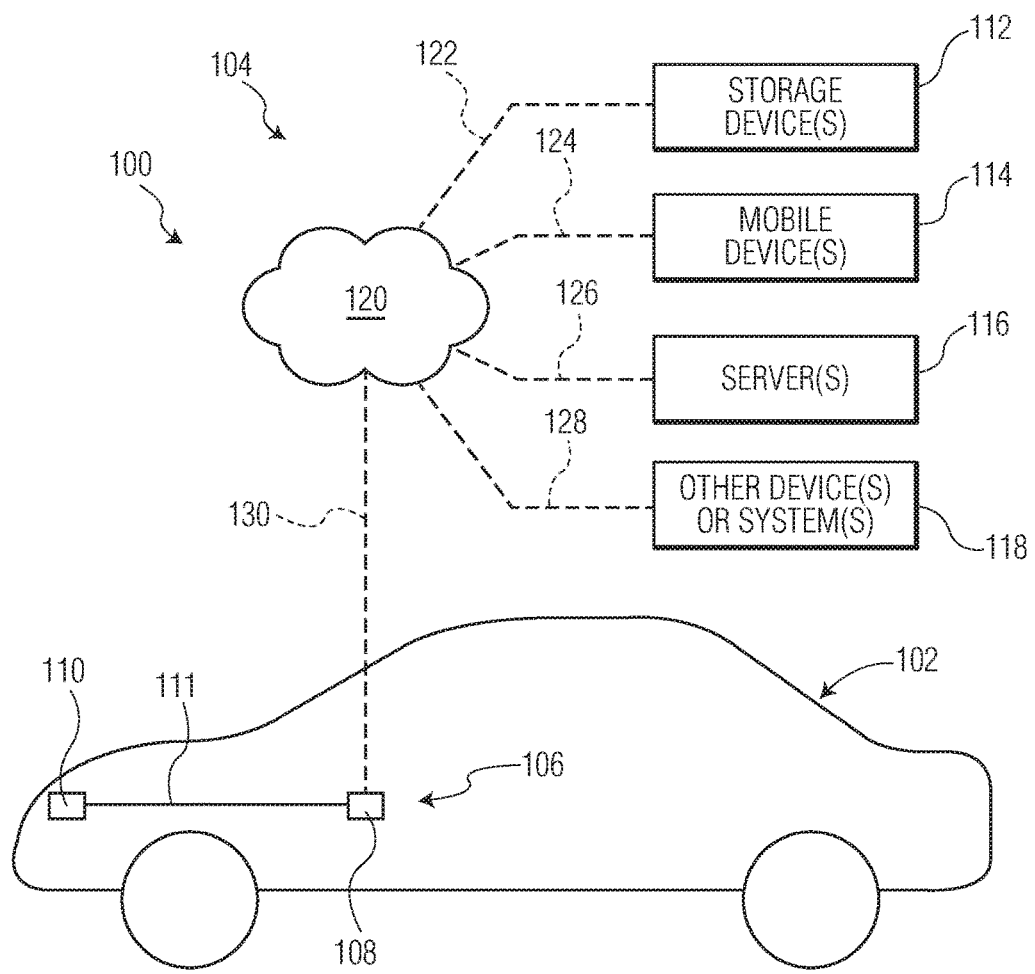
FIG. 1 is a schematic diagram showing an example electrical system implemented in part on a vehicle in accordance with an example embodiment encompassed herein.

Referring to FIG. 1, a schematic illustration is provided to show an example electrical system 100 that can perform one or more improved methods of a multi-task convolutional neural network in accordance with embodiments encompassed herein. As illustrated, in FIG. 1 the electrical system 100 can include a vehicle 102, which in the present example can be an electrically-powered automobile, and remote electrical system components 104 that are external of the vehicle. Additionally, FIG. 1 shows an on-board electrical system 106 that constitutes part of, and is supported within/by, the vehicle 102. The on-board electrical system 106 in FIG. 1 is shown, in a simplified manner, to include a computer system 108 that is in communication with input/output devices 110 by way of one or more communication link(s) 111, although several more specific features that can be present in one example of the on-board electrical system 106 are described in more detail with respect to FIG. 2. As described further in regard to FIG. 2, it should be appreciated that the input/output devices 110 can, and typically will, include one or more camera devices.

Further, FIG. 1 shows that the on-board electrical system 106 of the vehicle 102, in the present embodiment, can be in communication with any of a variety of different electrical system components that are located remotely from the vehicle 102. In the schematic diagram of FIG. 1, the remote electrical system components 104 includes one or more storage device(s) 112, one or more mobile device(s) 114, one or more server computer(s) (or server(s)) 116, and one or more other device(s) or system(s) 118, and each of the remote electrical components 104 is figuratively illustrated as being in communication with the on-board electrical system 106 by way of a network 120 representing the Internet (or, alternatively, the World Wide Web). First, second, third, fourth, and fifth communication links 122, 124, 126, 128, and 130 are respectively shown as coupling the one or more storage device(s) 112, the one or more mobile device(s) 114, the one or more server computer(s) 116, the one or more other device(s) or system(s) 118, and the computer system 108 of the on-board electrical system 106 with the network 120. Each of the communication links 122, 124, 126, 128, and 130 can be understood to encompass any one or more wireless or wired communication links, with the communication link(s) 130 particularly including at least one wireless component consistent with mobility of the vehicle 102.

Figure 2:
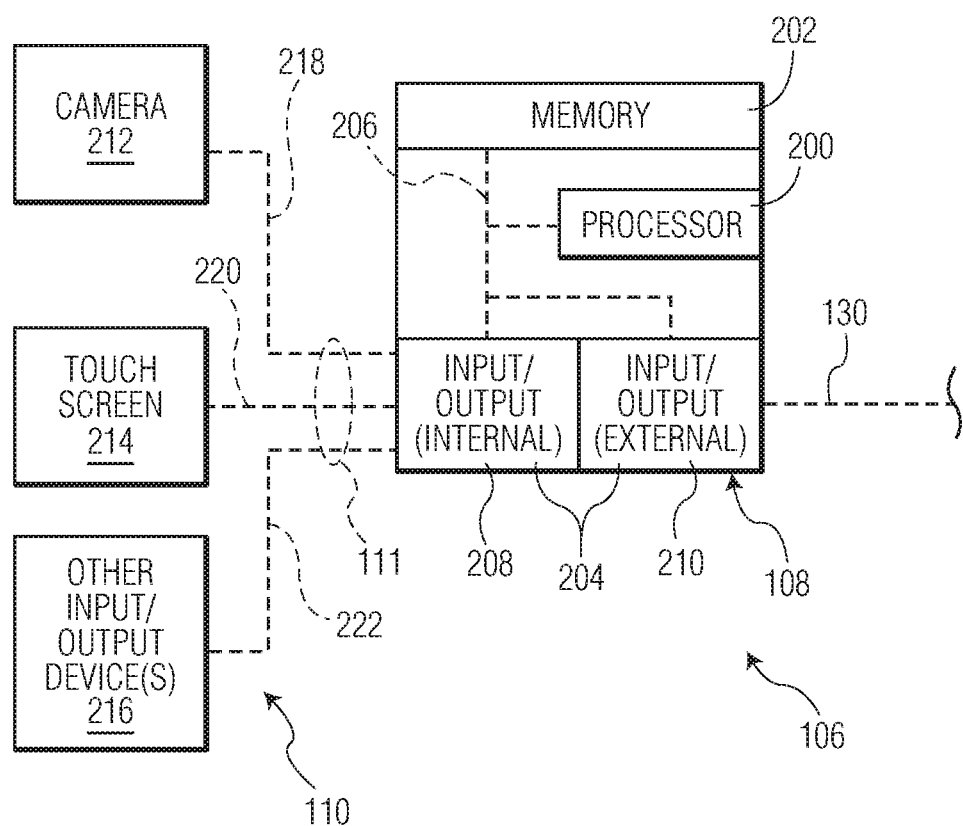
FIG. 2 is an additional schematic diagram showing in more detail portions of the electrical system of FIG. 1.

Referring additionally to FIG. 2, the on-board electrical system 106 is shown in more detail to show example components/subcomponents/devices of that system 106. Consistent with FIG. 1, the on-board electrical system 106 of FIG. 2 is shown to include the computer system 108 and the one or more input/output devices 110, with the computer system 108 and devices 110 being in communication by way of the one or more communication link(s) 111. More particularly as shown in FIG. 2, in the present embodiment the computer system 108 of the on-board electrical system 106 can be a general-purpose computer or a special-purpose computer and can include a processor 200, a memory 202, and one or more input/output port(s) 204. The processor 200, the memory 202, and the one or more input/output port(s) 204 are in communication with one another, directly or indirectly, by way of one or more internal communication link(s) 206, which can include wired or wireless links depending upon the embodiment. In at least some such embodiments, the internal communication link(s) 206 can take the form of a bus.

With respect to the processor 200, it should be appreciated that the processor 200 is intended to be representative of the presence of any one or more processors or processing devices, of any of a variety of forms. For example, the processor 200 is intended to be representative of any one or more of a microprocessor, a central processing unit (CPU), a controller, a microcontroller unit, an application-specific integrated circuit (ASIC), an application-specific instruction-set processor (ASIP), a graphics processing unit (GPU), a digital signal processor (DSP), a field programmable gate array (FPGA), a programmable logic device (PLD), a physics processing unit (PPU), a reduced instruction-set computer (RISC), or the like, or any combination thereof. The processor 200 can be configured to execute program instructions including, for example, instructions provided via software, firmware, operating systems, applications, or programs, and can be configured for performing any of a variety of processing, computational, control, or monitoring functions.

Further, the memory 202 of FIG. 2 is intended to be representative of the presence of any one or more memory or storage devices, which can be employed to store or record computer program instructions (e.g., those of an operating system or application), data, or information of any of a variety of types. In accordance with the present disclosure, such memory or storage devices can particularly be employed to store image or semantic label information as can be used or generated by way of semantic segmentation methods. Furthermore, in accordance with the present disclosure, such memory or storage devices can further store masks, feature maps, bounding boxes, and object instances (e.g., instance segmentation maps) as can be used or generated by way of instance segmentation methods. Additionally, depending upon the embodiment, the memory 202 can include any one or more of a variety of types of devices or components (or systems) such as, for example, mass storage devices, removable storage devices, hard drives, magnetic disks, optical disks, solid-state drives, floppy disks, flash drives, optical disks, memory cards, zip disks, magnetic tape, volatile read-and-write memory, random access memory (RAM) (e.g., dynamic RAM (DRAM) or static RAM (SRAM), etc.), or read-only memory (ROM) (e.g., erasable or electrically-erasable programmable ROM (EPROM or EEPROM), etc.).

Although the on-board electrical system 106, and particularly the computer system 108, is shown in FIG. 2 as including the memory 202 as part of that computer system, it should be evident from the storage device(s) 112 of FIG. 1 that the present disclosure is also intended to encompass embodiments in which the memory 202 operates in combination with, or is replaced by, one or more remote memory devices. Such remote memory devices corresponding to the storage devices 112 can include, for example, a cloud platform such as a public or private cloud, which is located remotely from the vehicle 102. Also, in some embodiments, the memory 202 and processor 200 can be integrated in a single device (e.g., a processor-in-memory (PIM)).

Further with respect to FIG. 2, the processor 200 and the memory 202 can be configured to include a convolutional neural network or multiple convolutional neural networks to perform the improved systems and methods described herein.

Further with respect to FIG. 2, the input/output ports 204 are shown to include each of internal input/output ports 208, by which the computer system 108 is coupled to the one or more input/output devices 110 of the on-board electrical system 106, as well as external input/output ports 210, which permit or facilitate communications between the computer system 108 and the remote electrical system components 104 (see FIG. 1). It should be appreciated that the external input/output ports 210 can include one or more devices, such as one or more wireless transponders, by which wireless communications can occur between the computer system 108 and the remote electrical system components 104 via the communication link(s) 130. Particularly with respect to the internal input/output ports 208, depending upon the embodiment, any one or more input/output devices 110 of any of a variety of types can be included by the on-board electrical system 106, and the number and configuration of the internal input/output ports 208 will be suited to allow for appropriate communications between the computer system 108 and the input/output devices by way of the one or more communication link(s) 111.

Although the particular input/output devices 110, internal input/output ports 208, and communication link(s) 111 can vary depending upon the embodiment, in the present example embodiment the input/output devices 110 particularly are shown to include each of a camera 212, a touch screen 214, and one or more other input/output device(s) 216. Relatedly, as shown in FIG. 2, the communication link(s) 111 in the present embodiment include communication links 218, 220, and 222 that respectively couple the internal input/output ports 208 with the camera 212, touch screen 214, and other input/output device(s) 216. It will be appreciated that the camera 212 particularly can be an optical camera that can obtain imaging data regarding one or more images of an environment surrounding the vehicle 102, which can be provided and utilized by other components of the electrical system 100 such as the computer system 108 or the one or more remote electrical system components 104 to perform the multi-task convolutional neural network in accordance with any of a variety of methods including the improved methods described herein.

It should be appreciated that the on-board electrical system 106, acting alone or in combination with the one or more remote electrical system components 104, can perform one or more other monitoring operations (e.g., based upon data provided by way of the input/output devices 110), and/or one or more other control operations in relation to the vehicle 102 or otherwise. Relatedly, it should be appreciated that the improved methods involving multi-task convolutional neural networks described herein can be understood to be subportions of other methods or processes that are larger or more expansive. The present disclosure, although describing improved methods and processes involving multi-task convolutional neural networks, is intended to encompass such other, larger or more expansive, methods or processes. Such larger or more expansive methods or processes can additionally include, for example, method or process steps or portions according to which information to be input or utilized for semantic segmentation and/or instance segmentation is obtained or pre-processed so as to be suitable for semantic segmentation and/or instance segmentation. Additionally, such larger or more expansive methods or processes can also include, further for example, method or process steps or portions according to which the results of semantic segmentation processes (e.g., semantic annotations) and/or instance segmentation processes (e.g., instance annotations) are utilized for other computer vision or image processing tasks or other tasks, as well as method or process steps or portion according to which the results of such other steps or portions are used to take various actions.

For example, it should be appreciated that, in some embodiments or circumstances, the results from the multi-task convolutional neural network processes can be utilized, directly or indirectly, to make autonomous vehicle driving determinations. Also for example, it should be appreciated that, in some embodiments or circumstances, the other input/output device(s) 216 can include other sensors or sensing systems that can detect aspects of the environment surrounding the vehicle 102, such as radar or lidar sensing systems. In some such embodiments or circumstances, the computer system 108 (alone or in combination with the one or more remote electrical system components 104) can make autonomous vehicle driving determinations or other determinations based upon combined portions of information including not only the results of multi-task convolutional neural network methods (or semantic segmentation and/or instance segmentation methods) such as those described herein, but also upon other sensed information as can be obtained via radar, lidar, or other sensing systems or sensors. Further, for example, based upon such autonomous vehicle driving determinations, the computer system 108 (alone or in combination with the one or more remote electrical system components 104) can generate and provide control signals to one or more components of the vehicle 102 including one or more of the input/output device(s) 216, for example, to a brake actuator and/or a steering wheel.

Notwithstanding the description provided above in regard to FIG. 1 and FIG. 2, it should be appreciated that the present disclosure is intended to be applicable to numerous other embodiments, implementations, or applications other than those described above in regard to FIG. 1 and FIG. 2. Indeed, although the vehicle 102 is described above as being an electrically-powered automobile (electric vehicle), the present disclosure also is intended to pertain to embodiments, implementations, or applications involving gasoline-powered automobiles and automobiles powered in other manners, as well as any of a variety of other types of vehicles or transportation systems. Such other types of vehicles or transportation systems can include, for example, a taxi, a bus, a train, a marine vessel or boat, an airplane or helicopter, or a spaceship. Additionally, notwithstanding the description provided above with respect to FIG. 1 and FIG. 2 that particularly relates to embodiments involving a vehicle, the present disclosure is intended to encompass numerous other embodiments, implementations, and applications in which improved methods of creating and/or applying multi-task convolutional neural networks, or improved methods relating to semantic segmentation or instance segmentation, are performed. For example, the present disclosure also pertains to other applications in which any of computer vision, image processing, or machine learning are employed, including for example applications involving augmented reality (or even virtual reality).

Further for example, notwithstanding the description above pertaining to a vehicle embodiment in relation to FIG. 1 and FIG. 2, the present disclosure is intended to encompass other embodiments in which methods of the multi-task convolutional neural network are performed by way of computer systems that do not form parts of vehicles but rather form parts of other devices including, for example, mobile devices such as smart phones, laptop computers, tablets, wearable devices, personal digital assistants (PDAs), navigation devices, gaming devices, virtual reality devices, or augmented reality devices. In any of such mobile devices or other devices, an electrical system corresponding to the electrical system 106, including both a computer system corresponding to the computer system 108 and one or more input/output devices corresponding to the input/output devices 110, can be included. Also, in any of such mobile devices or other devices, the electrical system corresponding to the electrical system 106 can likewise be configured for communication with one or more remote devices corresponding to the remote electrical system components 104.

Among other things, the present disclosure is intended to encompass any such mobile or other device (e.g., a personal computer, user terminal, or server computer, etc.) that is configured to perform the improved methods or systems involving multi-task convolutional neural networks described herein. In some such mobile or other devices, information utilized by the multi-task convolutional neural network can be obtained or received by way of operation of one or more of the input/output devices included on the mobile or other devices. For example, image information employed by the multi-task convolutional neural network can be obtained by way of a camera that is mounted on the mobile device. Also, in some such embodiments (as well as in some implementations corresponding to the electrical system 100 of FIG. 1), one type of information utilized by the improved multi-task convolutional neural network (e.g., image information) can be received by way of operation of one or more of the input/output devices of the respective mobile or other device itself, even though another type of information utilized by the improved multi-task convolutional neural network can be received from one or more remote devices corresponding to the remote electrical system component(s) 104.

Additionally, it should be appreciated that the present disclosure is intended to encompass numerous different embodiments in which an electrical system such as the electrical system 106 of a device, such as the vehicle 102, a mobile device, or other device, is in communication with one or more other remote devices, systems, or components by way of any of a variety of wired or wireless communications systems, networks, links, processes, or protocols. For example, the network 120 and associated communication links 122, 124, 126, 128, and 130 are intended to be representative of, or can be replaced by, any of a variety of networks, communications links, or associated technologies including, for example, a cellular network, a local area network (LAN), a wide area network (WAN), a wireless local area network (WLAN), Wi-Fi communications links or access points, a metropolitan area network (MAN), a public telephone switched network (PSTN), a Bluetooth network, a ZigBee network, a near field communication (NFC) network, or the like, or any combination thereof. Additionally, the network 120 and associated communication links 122, 124, 126, 128, and 130 are intended to be representative of, or can be replaced by, wired technologies such as, for example, a cable network, a wireline network, an optical fiber network, or a telecommunications network.

It should be appreciated that, in some embodiments, implementations, and applications encompassed herein, a multi-task convolutional neural network is performed (e.g., trained or applied) largely or entirely by a single computer or electrical system associated with a particular device, for example, by the electrical system 106 of the vehicle 102 of FIG. 1. However, it should also be recognized that, in other embodiments, implementations, and applications encompassed herein, a multi-task convolutional neural network is performed in a manner that involves multiple electrical systems or computer systems, which in some cases can be remotely located apart from one another, and/or operate in a distributed manner. Indeed, in some cases, multiple electrical systems and/or computer systems each having respective components or portions corresponding to those described in regard to the electrical system 106 and/or the computer system 108 of FIG. 2 can be present and can interact with one another. For example, FIG. 1 can also be viewed as encompassing an embodiment in which the multi-task convolutional neural network is performed in a distributed manner both by the electrical system 106 of the vehicle 102 and an electrical system of one of the mobile devices 114, where the electrical system of the mobile device includes both a camera and a computer system having components corresponding to those of the computer system 108.

Figure 3:
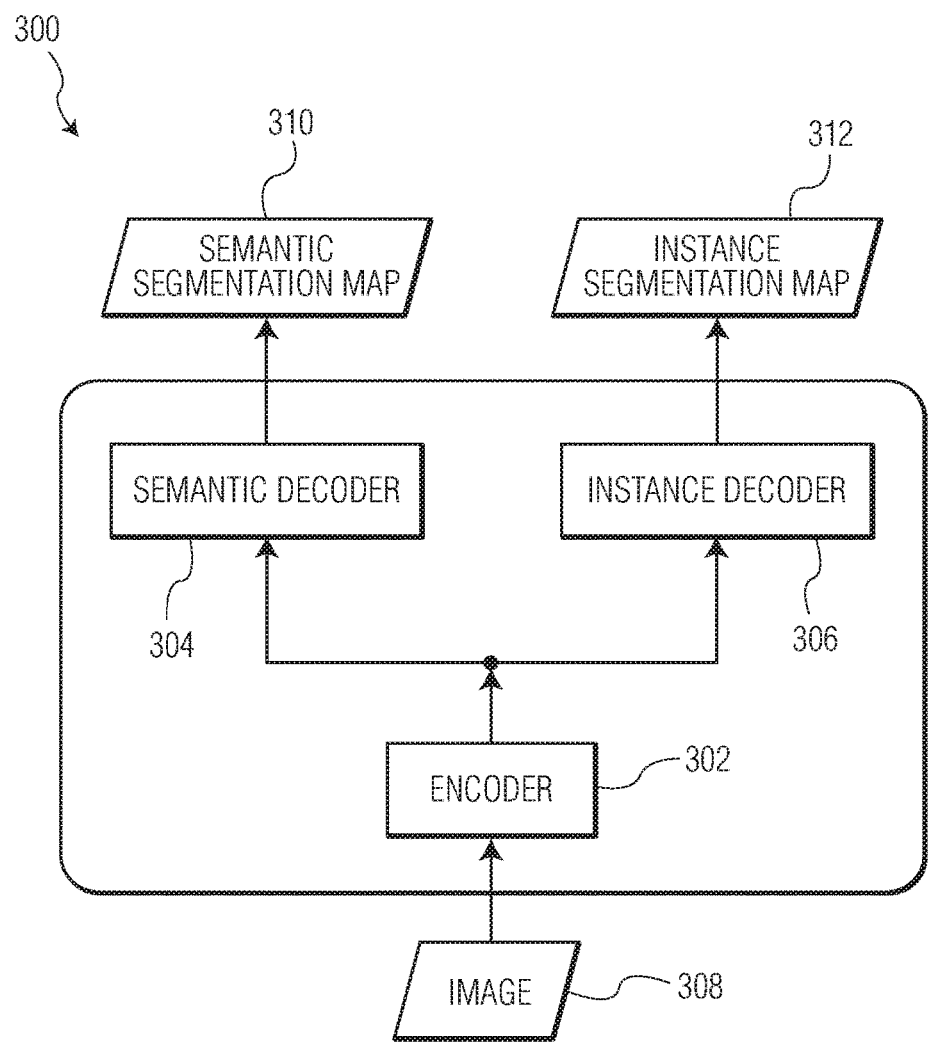
FIG. 3 illustrates a multi-task convolutional neural network according to an example embodiment.

Turning to FIG. 3, a network architecture for a multi-task convolutional neural network according to an example embodiment encompassed herein is illustrated. As illustrated in FIG. 3, the network architecture can embody a convolutional neural network 300. In the present example embodiment, the convolutional neural network 300 can include a shared encoder network 302, a semantic segmentation decoder network (or, more simply, "semantic decoder") 304, and an instance segmentation decoder network (or, more simply, "instance decoder") 306.

Additionally as shown in FIG. 3, an image 308 can be input into the encoder network 302. After receiving the image 308, the encoder network 302 can function as a feature extractor to generate a high-dimensional representation of the image 308. Further, the encoder network 302 can provide extracted features or feature maps to both the semantic segmentation decoder network 304 and the instance segmentation decoder network 306. As will be described in more detail in regard to FIG. 5 and FIG. 6, the high-dimensional representation or feature maps can be shared across all tasks within both the semantic segmentation decoder network 304 and the instance segmentation decoder network 306. In this manner, the encoder network 302 can be shared by all task-specific decoder networks.

In at least some embodiments encompassed herein, the encoder network 302 can comprise Xception, a deep learning variation with depth-wise separable convolutions first developed by Chollet (Chollet, F.: Xception: Deep learning with depthwise separable convolutions. In: CVPR 2017), which is incorporated by reference herein in its entirety). Xception can be chosen because it achieves excellent performance on benchmarks (e.g., ImageNet, Russakovsky, O., Deng, J., Su, H., Krause, J., Satheesh, S., Ma, S., Huang, Z., Karpathy, A., Khosla, A., Bernstein, M., Berg, A. C., Fei-Fei, L.: ImageNet Large Scale Visual Recognition Challenge. IJCV 2015, which is incorporated by reference herein in its entirety) and is well-known for fast computation by introducing depth-wise separable convolution. Furthermore, Qi et al modified Xception to be suitable for segmentation tasks. (Qi, H., Zhang, Z., Xiao, B., Hu, H., Cheng, B., Wei, Y., Dai, J.: Deformable convolutional networks—MSRA COCO detection and segmentation challenge 2017 entry. ICCV COCO Challenge Workshop 2017, which is incorporated by reference herein in its entirety).

Additionally, in at least some embodiments, the semantic segmentation decoder network 304 can apply convolution and bilinear interpolation to construct per pixel classification output. Further, in one example embodiment, the semantic segmentation decoder network 304 can comprise the DeepLab semantic segmentation network, which was introduced by Chen et al (Chen, L. C., Papandreou, G., Kokkinos, I., Murphy, K., Yuille, A. L.: DeepLab: semantic image segmentation with deep convolutional nets, atrous convolution, and fully connected CRFs. TPAMI 2017, which is incorporated by reference herein in its entirety). Furthermore, in at least some embodiments, the instance segmentation decoder network 306 can comprise a detector subnet and a segmentation subnet. Moreover, the detector subnet can comprise a bounding box regressor and a classifier, as would be understood by those having skill in the art. In one example embodiment, the instance segmentation decoder network 306 can comprise Mask R-CNN, which was introduced by He et al (Kaiming He, Georgia Gkioxari, Piotr Dollar, and Ross B. Girshick. Mask R-CNN. CoRR, abs/1703.06870, 2017, which is incorporated by reference herein in its entirety).

Referring again to FIG. 3, each of the semantic segmentation decoder network 304 and the instance segmentation decoder network 306 can generate and provide output information. More particularly as shown, the semantic segmentation decoder network 304 can output a semantic segmentation map 310, and the instance segmentation decoder network 306 can output an instance segmentation map 312. The semantic segmentation map 310 and the instance segmentation map 312 can be used for computer vision processes.

Figure 4:
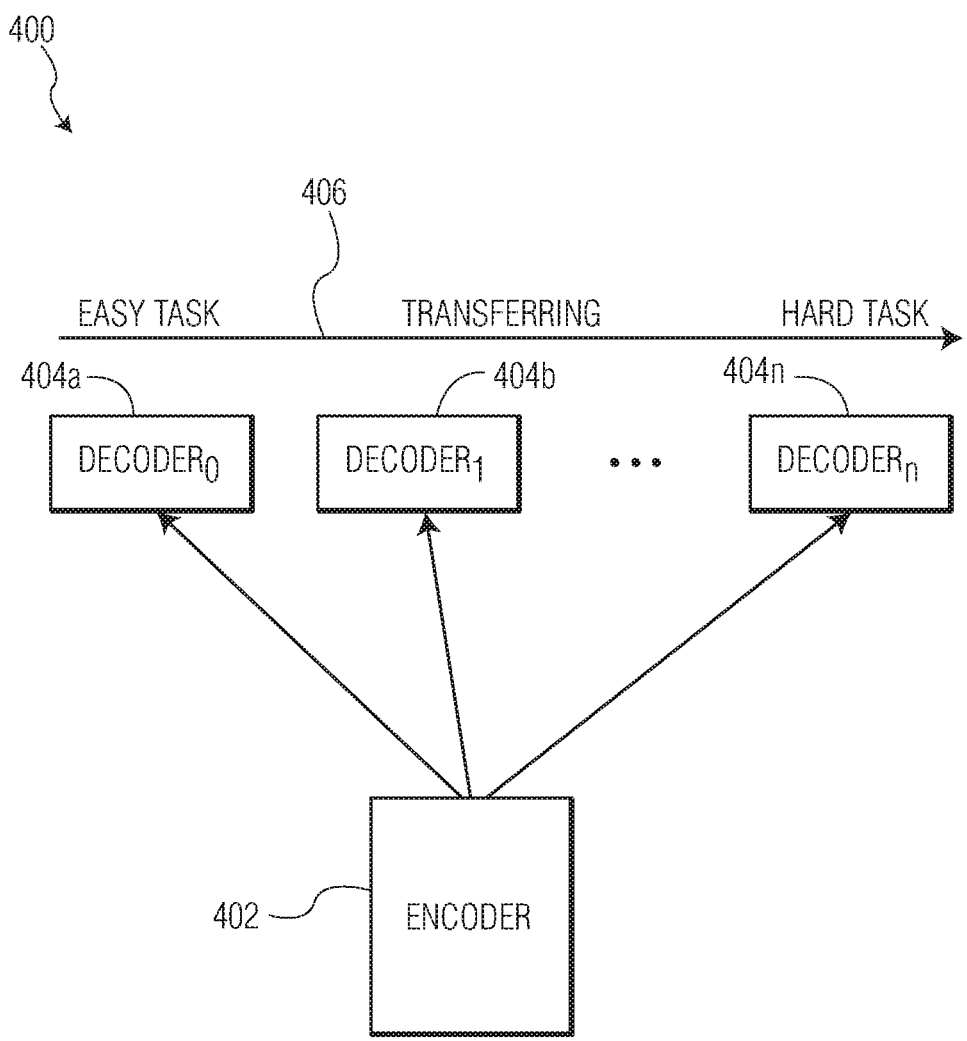
FIG. 4 is a schematic diagram illustrating a curriculum based transfer learning system according to an example embodiment.

In addition to having the shared encoder network 302, the multi-task convolutional neural network 300 can also implement, or operate in accordance with, curriculum based transfer learning. FIG. 4 is provided to illustrate, in a figurative manner, an example curriculum based transfer learning system 400 that is implemented in at least some of the improved methods and systems involving multi-task neural networks that are encompassed herein. More particularly as shown, the curriculum based transfer learning system 400 includes an encoder 402 that can be shared across a plurality of decoder networks 404a, 404b . . . 404n (where n is intended to be representative of any arbitrary integer and the number of decoder networks within the plurality of decoder networks can be any arbitrary number of such networks). That is, the encoder 402 can provide output and shares data to all of decoder networks of the plurality of decoder networks 404a, 404b . . . 404n.

As further illustrated by FIG. 4, the curriculum based transfer learning system 400 can transfer representations (in a form of feature maps) learned by "easier" tasks to more "difficult" tasks, as represented by an arrow 406 extending from a location adjacent to a first of the decoder networks (the decoder network 404a) to a location adjacent to a last of the decoder networks (the decoder network 404n). For example, representations learned from semantic segmentation, which is an "easier" artificial intelligence task requiring fewer computational resources and fewer machine learning decisions, can be provided (or transferred) to the instance decoder networks, which perform a more "difficult" artificial intelligence task. Instance segmentation can be considered a more difficult artificial intelligence task because instance segmentation involves detecting object instances and generate semantic segmentation map for each of the detected object instance. However, because the underlying representations of both semantic segmentation and instance segmentation are similar, instance segmentation can leverage the representations or feature maps learned by semantic segmentation to minimize the computing resources used to perform instance segmentation.

Figure 5:
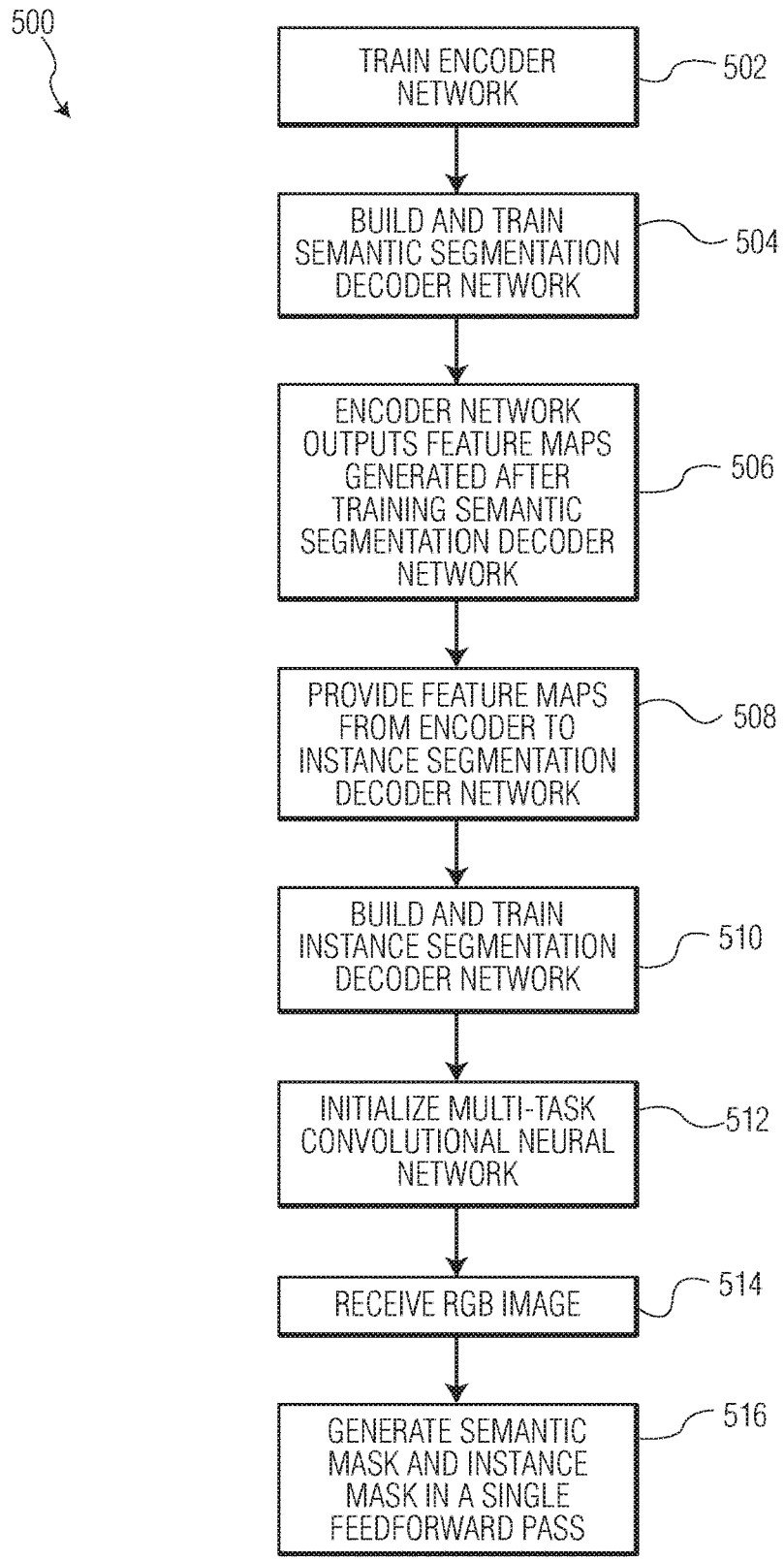
FIG. 5 is a flow chart showing an improved method involving a multi-task convolutional neural network as can be performed by way of the electrical system of FIG. 1, in accordance with an example embodiment.

Referring now to FIG. 5, a flow chart is provided to illustrate an improved method 500 involving a multi-task convolutional neural network in accordance with an example embodiment encompassed herein. It should be appreciated that the method 500 of FIG. 5 concerns a multi-task convolutional network that employs a shared encoder as discussed with respect to FIG. 3, as well as curriculum based transfer learning as discussed with respect to FIG. 4. To begin, the method 500 can include a step 502 at which an encoder network of a multi-task convolutional neural network (e.g., the encoder network 302 or the encoder network 404) is trained, particularly to initialize the encoder network. In some embodiments, the encoder network can be trained using ImageNet, which is an image dataset organized according to the Wordnet hierarchy, as would be understood by one skilled in the art.

Next, at a step 504, the method 500 can further include building and training a semantic segmentation decoder network (e.g., the semantic segmentation decoder network 304) in an end-to-end manner with the encoder network. Such building and training of the semantic segmentation decoder network can be performed using semantic segmentation objectives with feature input (e.g., feature maps or feature representations) provided by the encoder network during a down-sampling method. Furthermore, in some embodiments, the semantic segmentation decoder network can be built with parameters randomly initialized before training. Furthermore, in some embodiments, the semantic segmentation decoder network and encoder network can be trained in semantic segmentation using a publicly available dataset, such as the MSCOCO dataset (Lin, T. Y., et al.: Microsoft COCO: Common objects in context. In: ECCV. (2014), which is incorporated by reference herein in its entirety) or the Cityscapes dataset (Cordts, M., Omran, M., Ramos, S., Rehfeld, T., Enzweiler, M., Benenson, R., Franke, U., Roth, S., Schiele, B.: The cityscapes dataset for semantic urban scene understanding. In: CVPR. (2016), which is incorporated by reference herein in its entirety). Then, at a step 506, the method 500 can further include the encoder network outputting the feature maps generated after the training of the semantic segmentation decoder network. Further, at a step 508, the method can include providing the feature maps from the encoder to an instance segmentation decoder network (e.g., the instance segmentation decoder network 306).

Next, at a step 510, the method 500 can include the instance segmentation decoder network being built and trained using instance segmentation objectives and based on the feature maps received from the encoder network. More specifically, the feature maps provided by the encoder network can be the feature maps generated during the semantic segmentation process of step 504 (and perhaps also the step 502). In some embodiments, the instance segmentation decoder network can be built with parameters randomly initialized before training. Furthermore, in some embodiments, the instance segmentation decoder network can be trained using a publicly available dataset, such as the MSCOCO dataset or the Cityscapes dataset. In view of the above, because instance segmentation comprises a more difficult task involving higher reasoning of machine learning than semantic segmentation, the more difficult task (instance segmentation) can learn from representations (in a form of feature maps) learned from the easier task (semantic segmentation). Subsequently, at a step 512, parameters from the encoder, semantic segmentation decoder network, and the instance segmentation decoder network can be combined to initialize the multi-task convolutional neural network. In addition, the encoder network does not train with the instance segmentation decoder network, but instead provides outputs (e.g., feature maps) generated when performing semantic segmentation with the semantic segmentation decoder network.

Upon the completion of the step 512, the multi-task convolution neural network can be considered to be trained—that is, a first, training subprocess including the steps 502, 504, 506, 508, 510, and 512 can be considered to have been completed. After this training subprocess has been completed, then the multi-task convolutional neural network can be applied to imaging information or data by way of a second, application subprocess that particularly includes additional steps 514 and 516. More particularly in this regard, at the step 514, the initialized multi-task convolutional neural network can receive an RGB (red, green, and blue) image. Then, in response to receiving the RGB image, the multi-task convolutional neural network at the step 516 can generate a semantic segmentation map and an instance segmentation map in a single feedforward pass, with the semantic segmentation decoder network generating the semantic segmentation map and the instance segmentation decoder network generating the instance segmentation map. In some embodiments, the semantic segmentation map can assign an integer value to every pixel of the RGB image representing a class label, and the instance segmentation map can assign instance-wise labels to objects detected in the RGB image. Generating the semantic segmentation map can comprise the encoder network generating feature maps in tandem with the semantic segmentation decoder network, and the semantic segmentation decoder network generating the semantic segmentation map with the assistance of the encoder network. Furthermore, generating the instance segmentation map can comprise the instance segmentation decoder network receiving the feature maps generated by the encoder network during semantic segmentation and performing instance segmentation based on the feature maps from the encoder.

Figure 6:
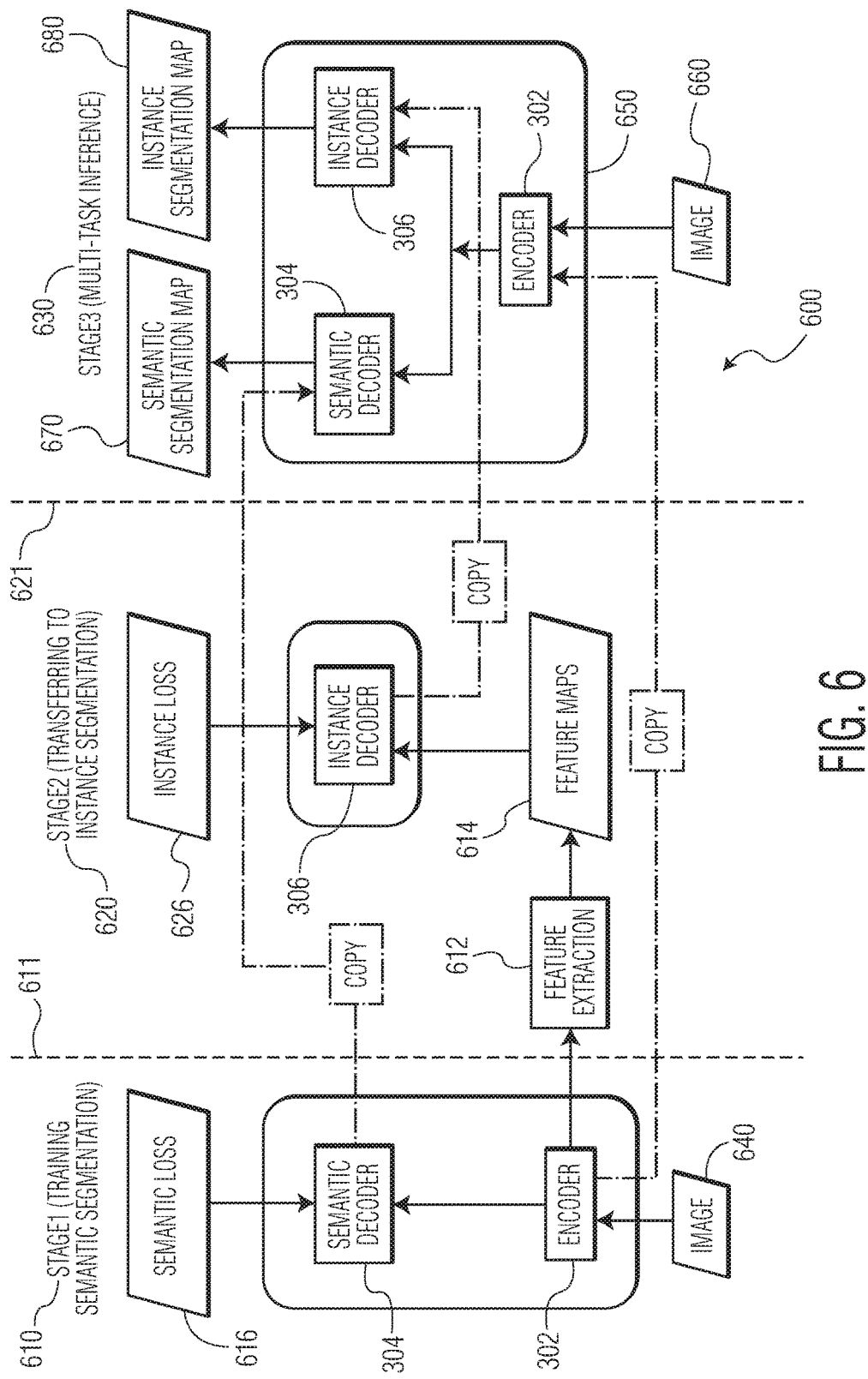
FIG. 6 is a schematic diagram illustrating an example network architecture of a multi-task convolutional neural network that can be operated according to the method of FIG. 5.

Referring additionally to FIG. 6, a schematic diagram 600 is provided to illustrate an example system or network architecture that can perform the method 500 illustrated in FIG. 5. The schematic diagram 600 illustrates the network architecture figuratively, in a manner intended to communicate that how the network architecture accommodates both training of a multi-task convolutional neural network and application of such a multi-task convolutional neural network in relation to input imaging information. In this regard, the network architecture is shown in the schematic diagram 600 as having three stages, namely, a first stage 610, a second stage 620, and third stage 630. For clarity, the first stage 610 corresponds to portions of the schematic diagram 600 that are positioned to the left of a first dashed line 611 as shown in FIG. 6, the third stage 630 corresponds to portions of the schematic diagram 600 that are positioned to the right of a second dashed line 621 as shown in FIG. 6, and the second stage 620 corresponds to portions of the schematic diagram 600 that are positioned in between the first and second dashed lines 611, 621.

As shown in FIG. 6, the first stage 610 involves training the semantic segmentation decoder network 304 and encoder network 302 in an end-to-end manner using a training dataset (e.g., a set of training images) 640. Further as shown, in the present embodiment, the training of the semantic segmentation decoder network 304 includes propagating back the gradients with respect to a semantic loss function 616 to the semantic segmentation decoder network 304 and the encoder network 302. According to an exemplary embodiment, the semantic loss function 616 can receive two inputs: a semantic segmentation map and semantic segmentation target. The semantic loss function can output a gradient of each model parameter with respect to the loss function. Then, the gradient can update a model parameter.

In contrast with the first stage 610, the second stage 620 involves training the instance segmentation decoder network 306. During the second stage 620, the encoder network 302 performs feature extraction 612 after the semantic segmentation decoder network 304 and the encoder network 302 are trained to generate feature maps 614. Additionally as shown in FIG. 6, the feature maps 614 generated during the second stage 620 can be input into the instance segmentation decoder network 306.

With the feature maps 614 being received by the instance segmentation decoder network 306 as input information (as provided from the encoder network 302), during the second stage 620 the instance segmentation decoder network 306 can train on the training dataset using instance segmentation objectives and based on the feature maps 614. In some embodiments, training the instance segmentation decoder network 306 also includes propagating back a gradient with respect to an instance loss function 626 to the instance segmentation decoder network 306. According to an exemplary embodiment, the instance loss function 626 can receive two inputs: an instance segmentation map and an instance segmentation target. The instance loss function 626 can output the gradient of each model parameter with respect to the loss function. The gradient can update a model parameter.

Upon completion of the training of the encoder network 302, the semantic segmentation decoder network 304, and the instance segmentation decoder network 306 during the first and second stages 610 and 620, a multi-task convolutional neural network 650 is (or can be considered) formed. Accordingly, the network architecture represented by the schematic diagram 600 enters the third stage 630. In the third stage 630, the multi-task convolutional neural network 650 can receive an image 660, and can output both a semantic segmentation outputs 670 based on the image 660 and also an instance segmentation outputs 680 based on the image 660 in a single feedforward pass (with a multi-task inference).

As shown, the multi-task convolutional neural network 650 includes each of the encoder network 302, the semantic segmentation decoder network 304, and the instance segmentation decoder network 306. The multi-task convolutional neural network 650 particularly generates the semantic segmentation output 670 based upon operation of the semantic segmentation decoder network 304, and generates the instance segmentation output 680 based upon operation of the instance segmentation decoder network 306. The semantic segmentation output 670 can be a semantic segmentation map, which assigns respective integer values to the respective pixels of the image 660 (and where each of the integer values is representative of a respective class label). The instance segmentation output 680 can be an instance segmentation map, which assigns instance-wise labels to objects detected in the image 660.

It will additionally be noted that FIG. 6 includes first, second, and third dot-dashed lines (and boxes labeled "copy" provided along each of those lines) respectively copying the encoder networks 302 of the first stage 610 and the third stage 630, the semantic segmentation decoder networks 304 of the first stage 610 and the third stage 630, and the instance segmentation decoder networks 306 of the second stage 620 and the third stage 630. In some embodiments, copying can mean that the encoder networks 302, the semantic segmentation decoder networks 304, and the instance segmentation decoder networks 306 used in the third stage 630 are identical in terms of model parameters and architecture from those used in the first stage 610 and the second stage 620. From this manner of illustration, it should be appreciated that the encoder network 302 as trained during the first stage 610, the semantic segmentation decoder network 304 as trained during the first stage 610, and the instance segmentation decoder network 306 as trained during the second stage 620, are all then utilized during application of the multi-task convolutional neural network 650 in the third stage 630. It should be noted that the encoder network 302 can be trained during the first stage 610 with the semantic segmentation decoder network 304.

Further as shown, the semantic segmentation decoder network 304 operates in response to output provided by the encoder network 302, which is generated by the encoder network 302 based upon the image 660. Also, the instance segmentation decoder network 306 operates in response to output provided by the encoder network 302, which is generated by the encoder network 302 based upon the image 660. Thus, both of the semantic segmentation output 670 and the instance segmentation output 680 are generated, at least indirectly upon the image 660.

Additionally in regard to the third stage 630, it should further be recognized that the output provided by the encoder network 302 to the instance segmentation decoder network 306 can take the form of feature maps, which can be of the same type as the feature maps 614 generated by the encoder fine tuned in the first stage 610 and provided for use in the second stage 620. At the same time, any feature maps generated by the encoder network 302 in the third stage 630 are generated in response to the image 660, which is different from the dataset (image) 640 received by the encoder network 302 in the first stage 610. Consequently, it should be appreciated that, if the feature maps 614 provided to the instance segmentation decoder network 306 in the second stage 620 are considered first feature maps, any feature maps generated by the encoder network 302 and provided to the instance segmentation decoder network 306 in the third stage 630 in this illustrated embodiment would be different, second feature maps.

As already discussed above, the present disclosure is intended to encompass a variety of improved multi-task convolutional neural networks, and methods and systems involving training such improved multi-task convolutional neural networks. Also, the present disclosure is intended to encompass a variety of larger methods that include, as parts of those methods, the performing of multi-task convolutional neural networks in accordance with any of the improved methods described herein. Further, it should be appreciated that, although the flowchart description provided with the present disclosure (e.g., in FIG. 3) illustrates processes and process steps (or operations) that can be performed by one or more systems or devices according to some embodiments encompassed by the present disclosure, the present disclosure is intended to encompass modified versions of these processes and process steps (or operations). For example, in some other embodiments encompassed herein, one or more of the steps of the method shown in FIG. 5 can be performed in different orders than that shown, in inverted orders relative to what is shown, or at different relative times than what is described above. Further for example, even if two process steps are described above as occurring at different times, the present disclosure is intended to encompass other embodiments in which those process steps occur simultaneously, or vice-versa. Further, the present disclosure is intended to encompass embodiments in which one or more other operations may be added or omitted relative to the processes described above.

While the principles of the invention have been described above in connection with specific apparatus and method, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method comprising:
an encoder network and a semantic segmentation decoder network of a convolutional neural network training on a dataset to perform a semantic segmentation task, wherein the encoder network generates first feature maps during the semantic segmentation task;
an instance segmentation decoder network of the convolutional neural network receiving the first feature maps from the encoder network generated during the semantic segmentation task; and
the instance segmentation decoder network training on the dataset using the first feature maps generated during the semantic segmentation task to perform an instance segmentation task.

2. The method of claim 1 further comprising:
the encoder network receiving an image;
the semantic segmentation decoder network outputting a semantic segmentation map and the instance segmentation decoder network outputting an instance segmentation map in a single feedforward pass, wherein the encoder network outputs second feature maps for the image to the instance segmentation decoder network and to the semantic segmentation decoder network.

3. The method of claim 2 wherein the image includes a plurality of pixels, wherein the semantic segmentation map assigns respective integer values to the respective pixels of the image, wherein each of the integer values is representative of a respective class label, and wherein the instance segmentation map assigns instance-wise labels to objects detected in the image.

4. The method of claim 1, wherein the dataset comprises a publicly available dataset, wherein the encoder network comprises Xception, wherein the semantic segmentation decoder network comprises DeepLab, and wherein the instance segmentation decoder network comprises Mask R-CNN.

5. The method of claim 1 further comprising one or both of randomly initializing first parameters of the semantic segmentation decoder network, and randomly initializing second parameters of the instance segmentation decoder network.

6. The method of claim 1, wherein the convolutional neural network is a multi-task convolutional neural network, wherein the encoder network is shared by each of the semantic segmentation decoder network and the instance segmentation decoder network, wherein the multi-task convolutional neural network operates at least partly in accordance with curriculum based transfer learning, wherein the curriculum based learning transfer comprises the encoder network being trained using the dataset, the encoder network and the semantic segmentation decoder network being trained end-to-end on a semantic segmentation target, the encoder network generating the first feature maps, the instance segmentation decoder network receiving the first feature maps to train the instance segmentation decoder network, and combining parameters from the encoder network, the semantic segmentation decoder network, and the instance segmentation decoder network to form the multi-task convolutional neural network.

7. The method of claim 1 wherein the training of the semantic segmentation decoder network further comprises back propagating a gradient with respect to a semantic loss function.

8. The method of claim 1 wherein the training of the instance segmentation decoder network further comprises back propagating a gradient with respect to an instance loss function.

9. The method of claim 1 further comprising training the encoder network using a training dataset.

10. A system comprising:
    at least one memory device; and
    at least one processing device coupled at least indirectly with the at least one memory device, and configured to operate in accordance with a convolutional neural network architecture including an encoder network, a semantic segmentation decoder network, and an instance segmentation decoder network,
    wherein the encoder network and the semantic segmentation decoder network are configured to train on a dataset to perform a semantic segmentation task,
    wherein the encoder network is further configured to generate first feature maps during the semantic segmentation task,
    wherein the instance segmentation decoder network is configured to receive the first feature maps generated by the encoder network, and
    wherein the instance segmentation decoder network is configured to train using the first feature maps and the dataset to perform an instance segmentation task.

11. The system of claim 10,
    wherein the encoder network is further configured to receive an image, and
    wherein the encoder network is further configured to generate and to output, to the instance segmentation decoder network, second feature maps relating to the image generated during the semantic segmentation task.

12. The system of claim 11, wherein the at least one processing device is further configured to operate so that, in a single feedforward pass, the semantic segmentation decoder network outputs a semantic segmentation map and the instance segmentation decoder network outputs an instance segmentation map based at least in part upon the second feature maps.

13. The system of claim 12, wherein the image includes a plurality of pixels, wherein the semantic segmentation map assigns respective integer values to the respective pixels of the image, wherein each of the integer values is representative of a respective class label, and wherein the instance segmentation map assigns instance-wise labels to objects detected in the image.

14. The system of claim 10, wherein the dataset comprises a publicly available dataset, wherein the encoder network comprises Xception, wherein the semantic segmentation decoder network comprises DeepLab, and wherein the instance segmentation decoder network comprises Mask R-CNN.

15. The system of claim 10, wherein the at least one processing device is further configured to randomly initialize first parameters of the semantic segmentation decoder network, or to randomly initialize second parameters of the instance segmentation decoder network.

16. The system of claim 10, wherein the semantic segmentation decoder network is further configured to back propagate a first gradient with respect to a semantic loss function, and wherein the instance segmentation decoder network is further configured to back propagate a second gradient with respect to an instance loss function.

17. The system of claim 10, wherein the at least one processing device is further configured to train the encoder network using the dataset.

18. A method of image processing involving a convolutional neural network, the method comprising:
    training the convolutional neural network, wherein the training includes each of:
        training a semantic segmentation decoder network of the convolutional neural network;
        generating first feature maps by way of an encoder network of the convolutional neural network after training the semantic segmentation decoder network, based at least in part upon a dataset received at the encoder network; and
        training an instance segmentation decoder network of the convolutional neural network based at least in part upon the first feature maps; and
    applying the convolutional neural network, wherein the applying includes each of:
        receiving an image; and
        generating each of a semantic segmentation map and an instance segmentation map in response to the receiving of the image, in a single feedforward pass.

19. The method of image processing of claim 18,
    wherein the convolutional neural network is initialized as a multi-task convolutional neural network after the training of the semantic segmentation decoder network and the training of the instance segmentation decoder network have both been completed, and
    wherein the training of the convolutional neural network additionally includes training of the encoder network.

20. The method of claim 18, wherein the applying of the convolutional neural network additionally includes generating second feature maps by way of the encoder network, wherein the semantic segmentation map is generated by the semantic segmentation decoder network, and wherein the instance segmentation map is generated by the instance segmentation decoder network based at least in part upon the second feature maps.

* * * * *